(12) United States Patent
Hajji et al.

(10) Patent No.: US 6,334,616 B1
(45) Date of Patent: Jan. 1, 2002

(54) FERROFLUID CAP SEAL FOR SPINDLE MOTOR

(75) Inventors: M. Amine Hajji; Andrew K. Hanlon, both of San Jose; Holavanahally Seshachar Nagaraj, Morgan Hill, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/416,970

(22) Filed: Oct. 12, 1999

(51) Int. Cl.[7] .............................. F16J 15/44; F16J 15/43
(52) U.S. Cl. ........................................ 277/409; 277/410
(58) Field of Search .................................. 277/410, 409

(56) References Cited

U.S. PATENT DOCUMENTS

| | | | |
|---|---|---|---|
| 4,502,700 A | * 3/1985 | Gowda | 277/80 |
| 4,862,754 A | * 9/1989 | Nimberger | 73/864.62 |
| 5,323,076 A | 6/1994 | Hajec | 310/90 |
| 5,396,134 A | 3/1995 | Mochizuki | 310/67 |
| 5,536,986 A | 7/1996 | Fukuyama et al. | 310/67 R |
| 5,698,915 A | 12/1997 | Fukuyama et al. | 310/67 R |

* cited by examiner

Primary Examiner—Lynne H. Browne
Assistant Examiner—Matthew E. Rodgers
(74) Attorney, Agent, or Firm—Robert B. Martin; Bracewell & Patterson, L.L.P.

(57) ABSTRACT

A hard disk drive spindle motor has a hub, a drive shaft, and a bearing therebetween. The spindle motor also has a ferrofluid seal to prevent any incidental oil emissions from the bearing from entering the drive. A ferrofluid cap is mounted on the axial end of the spindle motor for sealing the ferrofluid seal. The cap is a flat ring and has an elastomeric pad around its outer edge. The pad seats in a recess in the bore of the hub. The cap does not touch the shaft as it rotates with the hub about the shaft. Any excess ferrofluid from the ferrofluid seal is forced radially outward away from the shaft by centrifugal force. The cap contains the excess ferrofluid within the spindle motor and prevents it from entering other areas of the disk drive.

5 Claims, 1 Drawing Sheet

FERROFLUID CAP SEAL FOR SPINDLE MOTOR

BACKGROUND OF THE INVENTION

1. Technical Field

This invention relates in general to sealing motors and in particular to a ferrofluid cap seal for a hard disk drive spindle motor.

2. Background Art

Referring to FIG. 1, a schematic drawing of an information storage system comprising a magnetic hard disk drive 11 is shown. Drive 11 has a base 13 containing a plurality of stacked, parallel magnetic disks 15 (one shown) which are closely spaced apart. Disks 15 are rotated by a spindle motor (not shown) located therebelow about a central drive hub 17. An actuator 21 is pivotally mounted to base 13 about a pivot assembly 23. A controller 19 is mounted to base 13 for selectively moving actuator 21 as will be described below.

Actuator 21 has a mounting support 25, a pair of parallel, cantilevered load beams or suspensions 27 extending from mounting support 25, and a head gimbal assembly 29 having at least one magnetic read/write head secured to each suspension 27 for magnetically reading data from or magnetically writing data to disks 15. Suspensions 27 have a spring-like quality which biases or maintains them in parallel relationship relative to one another. A motor assembly 31 having a conventional voice coil motor is also mounted to pivot assembly 23 opposite head gimbal assemblies 29. Movement of actuator 21 (indicated by arrows) moves head gimbal assemblies 29 radially across tracks on the disks 15 until the heads on assemblies 29 settle on the target tracks.

The spindle motor contains bearings that incidentally emit very small amounts of oil vapor and aerosol droplets of grease. These are potential sources of contamination in the disk drive. Some prior art disk drive use ferrofluid seals to seal the bearings. Ferrofluid seals are practically impermeable to emissions from bearings and function by suspending magnetically attracted fluid across an opening. The suspended fluid, which is essentially frictionless, forms an effective liquid seal.

Some prior art ferrofluid seals allow a very small amount of ferrofluid to migrate into the disk drive over time. In addition, a ferrofluid droplet may be inadvertently dispensed onto the top of the seal assembly, or excess ferrofluid may be dispensed into the seal. Such leakage and excess can cause contamination of the drive leading to data loss or even catastrophic failure of the drive. In the prior art, ferrofluid caps have been used to seal ferrofluid seals. Techniques for securing the caps in the spindle motor have included adhesive bonding and mechanical snap fits. The mechanical snap fit, annular caps were provided with slits and a lip around their outer perimeter to enable them to be snapped over the backiron of the spindle motor. The snap fit caps were designed to protect the ferrofluid seal while handling during manufacturing. Unfortunately, the bonding and the subsequent inspection process are expensive, and the snap fit cap designs provide no protection against ferrofluid escape. Thus, an improved cap for preventing the escape of ferrofluid from ferrofluid seals is needed.

SUMMARY OF THE INVENTION

A hard disk drive spindle motor has a hub, a drive shaft, and a bearing therebetween. The spindle motor also has a ferrofluid seal to prevent any incidental oil emissions from the bearing from entering the drive. A ferrofluid cap is mounted on the axial end of the spindle motor for sealing the ferrofluid seal. The cap is a flat ring and has an elastomeric pad around its outer edge. The pad seats in a recess in the bore of the hub. The cap does not touch the shaft as it rotates with the hub about the shaft. Any excess ferrofluid from the ferrofluid seal is forced radially outward away from the shaft by centrifugal force. The cap contains the excess ferrofluid within the spindle motor and prevents it from entering other areas of the disk drive.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

BEST MODE FOR CARRYING OUT THE INVENTION

Figure 1:
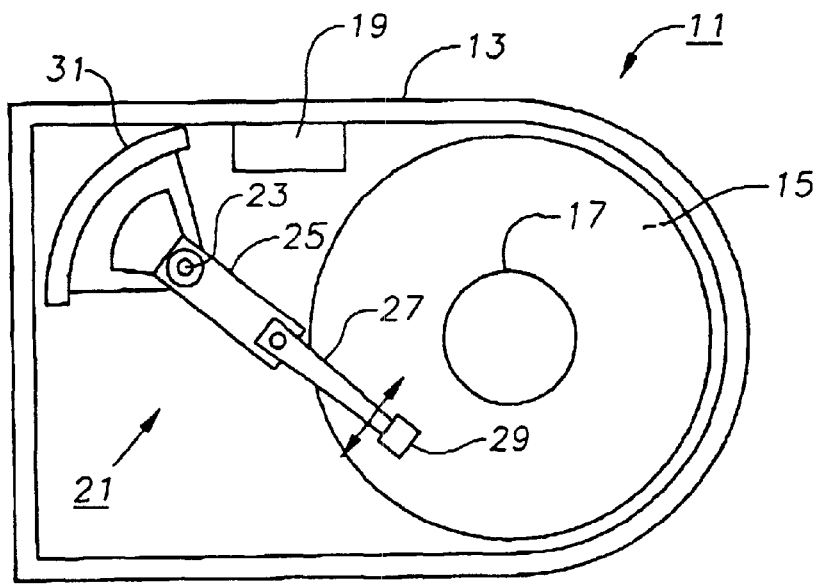
FIG. 1 is a schematic plan view of a hard disk drive.
Figure 2:
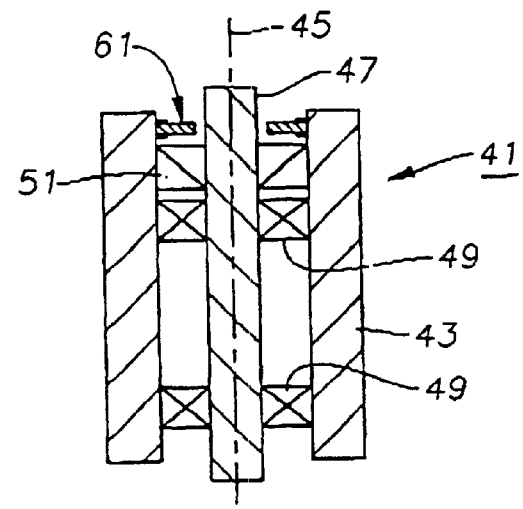
FIG. 2 is a schematic sectional side view of a disk drive spindle motor that is constructed in accordance with the invention.
Figure 3:
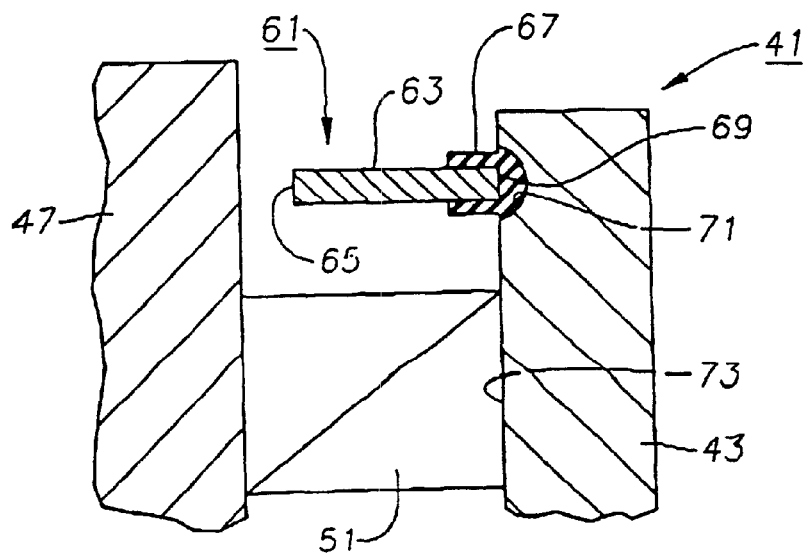
FIG. 3 is an enlarged schematic sectional side view of a portion of the spindle motor of FIG. 2.

Referring now to FIGS. 2 and 3, spindle motor 51 also has a ferrofluid cap 61. Cap 61 is located on one axial end of motor 41, on the axially outboard side of ferrofluid seal 51, opposite of bearing 49. Cap 61 comprises a substantially flat, solid disc 63 without slits or holes except for a central hole 65. Disc 63 may be configured for a variety of applications, but is preferably formed from stamped stainless steel or like materials. Central hole 65 accommodates the end of shaft 47 and is free of contact therewith. An annular pad 67 is integrally mounted to the outer edge or circumference 69 of disc 63. In the preferred embodiment, pad 67 is formed from an elastomer or equivalent conforming material and is molded to circumference 69. Pad 67 is closely received in an annular concave recess 71 in the bore 73 of hub 43. With pad 67, cap 61 forms an additional seal in hub 43 that does not require adhesive.

In operation, cap 61 is pressed or installed in spindle motor 41 such that pad 69 forms a tight elastomeric or equivalent conforming material seal in recess 71. Cap 61 is free of contact with shaft 47 and rotates with hub 43 about the stationary shaft 47. Any excess ferrofluid or ferrofluid migration from the dynamic ferrofluid seal 51 is directed radially outward away from shaft 47 by way of centrifugal force. As a result, cap 61 forms an effective seal around bore 73 that contains any excess ferrofluid within spindle motor 41 and prevents it from entering other areas of the disk drive.

Referring now to FIGS. 2 and 3, spindle motor 51 also has a ferrofluid cap 61. Cap 61 is located on one axial end of motor 51, on the axially outboard side of ferrofluid seal 51, opposite of bearing 49. Cap 61 comprises a substantially flat, solid disc 63 without slits or holes except for a central hole 65. Disc 63 may be configured for a variety of applications, but is preferably formed from stamped stainless steel or like materials. Central hole 65 accommodates the end of shaft 47 and is free of contact therewith. An annular pad 67 is integrally mounted to the outer edge or circumference 69 of disc 63. In the preferred embodiment, pad 67 is formed from an elastomer or equivalent conforming material and is molded to circumference 69. Pad 67 is closely received in an annular concave recess 71 in the bore 73 of hub 43. With pad 67, cap 61 forms an additional seal in hub 43 that does not require adhesive.

In operation, cap 61 is pressed or installed in spindle motor 61 such that pad 69 forms a tight elastomeric or equivalent conforming material seal in recess 71. Cap 61 is free of contact with shaft 47 and rotates with hub 43 about the stationary shaft 47. Any excess ferrofluid or ferrofluid migration from the dynamic ferrofluid seal 51 is directed radially outward away from shaft 47 by way of centrifugal force. As a result, cap 61 forms an effective seal around bore 73 that contains any excess ferrofluid within spindle motor 41 and prevents it from entering other areas of the disk drive.

The invention has several advantages. The ferrofluid cap relies on a press-fit elastomeric seal around its circumferential edge to prevent ferrofluid from entering the disk drive. The cap does not use adhesives or mechanical snap features to achieve the seal. This cap is relatively inexpensive compared to prior art solutions and provides superior sealing capability.

While the invention has been shown or described in only some of its forms, it should be apparent to those skilled in the art that it is not so limited, but is susceptible to various changes without departing from the scope of the invention.

We claim:

1. A rotational apparatus, comprising:
    a hub having a central axis, a bore, an annular recess formed in the bore, and an axial end;
    a shaft mounted in the hub concentric with the axis, the hub and the shaft being rotatable relative to each other;
    one or more bearings mounted between the shaft and the hub;
    a ferrofluid seal mounted axially outboard of all of said one or more bearings between the shaft and the hub for sealing all of said one or more bearings in the hub, the ferrofluid seal containing ferrofluid;
    a solid ferrofluid cap mounted in the annular recess in the bore of the hub axially outboard of the ferrofluid seal and all of said one or more bearings for sealing the ferrofluid in the hub, the cap comprising a circular disc with an outer circumferential edge and an axial hole that is free of contact with the shaft; and
    an elastomeric seal mounted to the outer circumferential edge of the ferrofluid cap for engaging the annular recess in the bore of the hub to form a seal.

2. The rotational apparatus of claim 1 wherein the elastomeric seal is molded to the cap.

3. The rotational apparatus of claim 1 wherein the cap is free of adhesive bonds with respect to the hub.

4. The rotational apparatus of claim 1 wherein the bore of the hub has an annular recess for engaging the cap.

5. A hard disk drive, comprising:
    a base having a disk, an actuator for reading data from and writing data to the disk, and a motor for rotating the disk; wherein the motor comprises:
    a hub having a central axis, a bore with an annular concave recess, and an axial end;
    a shaft located in the hub concentric with the axis;
    one or more bearings mounted between the shaft and the hub for allowing rotation between the shaft and the hub;
    a ferrofluid seat mounted axially outboard of all of said one or more bearings between the shaft and the hub for sealing all of said one or more bearings in the hub, the ferrofluid seal containing ferrofluid;
    a ferrofluid cap mounted in the annular concave recess in the bore of the hub axially outboard of the ferrofluid seal and all of said one or more bearings for sealing the ferrofluid in the hub, the cap comprising a solid circular disc with an outer circumferential edge and an axial hole for remaining free of contact with the shaft; and
    an elastomeric seal integrally formed on the outer circumferential edge of the cap for engaging the annular concave recess in the bore of the hub to form a seal; and wherein
    the elastomeric seal is free of adhesive bonds with respect to the hub.

* * * * *

UNITED STATES PATENT AND TRADEMARK OFFICE
CERTIFICATE OF CORRECTION

| | |
|---|---|
| PATENT NO. | : 6,334,616 B1 |
| APPLICATION NO. | : 09/416970 |
| DATED | : January 1, 2002 |
| INVENTOR(S) | : M. Amine Hajji et al. |

It is certified that error appears in the above-identified patent and that said Letters Patent is hereby corrected as shown below:

In Column 2, lines 34 through 49, please replace the entire paragraph with:

--Referring to Figure 2, a hard disk drive spindle motor 41 having an outer housing or hub 43 with an axis 45 and a concentric drive shaft 47 is shown. In the embodiment shown, shaft 47 stationarily mounts to the disk drive base (not shown) and hub 43 is rotatable relative thereto. Alternatively, hub 43 may be mounted to the base and shaft 47 could rotate relative to it. At least one rotary bearing 49 (two shown) is mounted between hub 43 and shaft 47 to enhance the stability of hub 43 as it rotates. During operation, bearing 49 incidentally emits small amounts oil vapor and aerosol droplets of grease which are a potential source of contamination in the disk drive--.

In Column 2, lines 50 through 59, please replace the entire paragraph with:

--Spindle motor 41 contains a ferrofluid seal 51 to seal bearing 49 in the drive. Ferrofluid seal 51 is located axially outside or outboard of bearing 49, and is practically impermeable to emissions from bearing 49. The ferrofluid in seal 51 contains very small magnetic particles which are suspended in a carrier fluid. Ferrofluid seal 51 functions by suspending the magnetically attracted fluid between hub 43 and shaft 47 to complete the magnetic circuit. The suspended fluid, which is essentially frictionless, forms an effective liquid seal between the rotating hub 43 and shaft 47--.

In Column 2, line 62, after the word "motor", please change "51" to --41--.

In Column 2, lines 60 through 67 and in Column 3, lines 1-8, please replace the entire paragraph with:

--Referring now to Figures 2 and 3, spindle motor 51 also has a ferrofluid cap 61. Cap 61 is located on one axial end of motor 41, on the axially outboard side of ferrofluid seal 51, opposite of bearing 49. Cap 61 comprises a substantially flat, solid disc 63 without slits or holes except for a central hole 65. Disc 63 may be configured for a variety of applications, but is preferably formed from stamped stainless steel or like materials. Central hole 65 accommodates the end of shaft 47 and is free of contact therewith. An annular pad 67 is integrally mounted to the outer edge or circumference 69 of disc 63. In the preferred embodiment, pad 67 is formed from an elastomer or equivalent conforming material and is molded to circumference 69. Pad 67 is closely received in an annular concave recess 71 in the bore 73 of hub 43. With pad 67, cap 61 forms an additional seal in hub 43 that does not require adhesive--.

UNITED STATES PATENT AND TRADEMARK OFFICE
CERTIFICATE OF CORRECTION

| | |
|---|---|
| PATENT NO. | : 6,334,616 B1 |
| APPLICATION NO. | : 09/416970 |
| DATED | : January 1, 2002 |
| INVENTOR(S) | : M. Amine Hajji et al. |

It is certified that error appears in the above-identified patent and that said Letters Patent is hereby corrected as shown below:

In Column 3, lines 9 through 18, please replace the entire paragraph with:

--In operation, cap 61 is pressed or installed in spindle motor 41 such that pad 69 forms a tight elastomeric or equivalent conforming material seal in recess 71. Cap 61 is free of contact with shaft 47 and rotates with hub 43 about the stationary shaft 47. Any excess ferrofluid or ferrofluid migration from the dynamic ferrofluid seal 51 is directed radially outward away from shaft 47 by way of centrifugal force. As a result, cap 61 forms an effective seal around bore 73 that contains any excess ferrofluid within spindle motor 41 and prevents it from entering other areas of the disk drive.

In Column 3, line 36, remove the words "one or more" and change to --at least two--.

In Column 3, line 39, remove the words "one or more" and change to --at least two--.

In Column 3, line 40, after the word "sealing" please insert the words --emissions of--.

In Column 3, line 40, remove the words "one or more" and change to --at least two--.

In Column 4, line 1, remove the words "one or more" and change to --at least two--.

In Column 4, line 1, after the word "sealing" please insert the word --emissions of--.

In Column 4, line 20, after the word "and" please change "an" to --two--.

In Column 4, line 20, after the word "axial" please change "end" to --ends--.

In Column 4, line 21, remove the words "one or more bearings" and change to --a bearing--.

In Column 4, line 21, after the word "mounted" please insert the words --adjacent to each axial end of the hub--.

In Column 4, lines 24 and 25, after the word "of" please remove the words "all of said one or more" and insert the word --the--.

UNITED STATES PATENT AND TRADEMARK OFFICE
CERTIFICATE OF CORRECTION

PATENT NO. : 6,334,616 B1
APPLICATION NO. : 09/416970
DATED : January 1, 2002
INVENTOR(S) : M. Amine Hajji et al.

It is certified that error appears in the above-identified patent and that said Letters Patent is hereby corrected as shown below:

In Column 4, line 26, after the word "sealing" please remove the words "all of said one or more" and insert the word --emissions of the--.

In Column 4, line 30, after the word "and" please remove the words "all of said one or more" and insert the words --the--.

In Column 4, line 31, after the word "sealing" insert the words --emissions of--.

Signed and Sealed this

Fourth Day of September, 2007

JON W. DUDAS
*Director of the United States Patent and Trademark Office*